3,445,813

INFORMATION TRANSMISSION SYSTEM

Jack Richard Price, Stafford, England, assignor to The English Electric Company Limited, London, England, a British company Filed June 2, 1965, Ser. No. 460,797
Claims priority, application Great Britain, June 10, 1964, 24,142/64
Int. Cl. H04q 9/00
U.S. Cl. 340—150 6 Claims

ABSTRACT OF THE DISCLOSURE

The specification describes a system for transmitting analogue information signals between a central station and a plurality of out-stations via a single multi-conductor transmission cable having "address" conductors and "information" conductors. Information signal producing means (for example transducers) and storage means located at an out-station and the central station respectively are connected together as required through information conductors of the cable and two switching means disposed at the respective stations. These switching means are controlled by out-station address decoders which respond only to a predetermined unique combination of electric potentials which are applied to the address conductors when required by an address signal producing means located at the central station. All of the electric power required for driving the switching means, the address decoders, and the respective analogue information signal producing means at the out-stations is supplied from a source located at the central station through conductors of the cable.

This invention relates to information transmission systems.

According to the present invention an information transmission system for transmitting information between a central station and a plurality of out-stations includes located at the central station an electric power supply means for supplying the power needs of the transmission system at the out-stations, an electric addressing means for providing an address code electric signal identifying uniquely any out-station selected for the time being for the purpose of transmitting information from that out-station, and means for receiving information in the form of electrical signals from an out-station, includes located at each out-station address signal decoding means for receiving address code electric signals and for responding, when suitably energized, to a unique address code electric signal which represents its own out-station address code, information generating means for generating electric information signals apertaining to the state of the out-station, and switching means controlled by the address signal decoding means for connecting the information generating means with terminal means whenever the address signal decoding means responds to its own out-station address code electric signal, and includes an electric transmission means for inter-connecting the central station and the out-stations, this transmission means including means for transmitting electric power from the electric power supply means at the central station to each of the out-stations for energising at least the respective address signal decoding means and switching means, means for transmitting the address code electric signals from the addressing means at the central station to the address signal decoding means at each out-station, and means for transmitting electric information signals between the information receiving means in the central station and the said terminal means at each out-station.

Preferably, the said means for transmitting electric power, for transmitting the address code electric signals, and for transmitting electric information signals all comprise electrically-separate circuits in a single multi-core electric cable.

According to another feature of the present invention the means located at the central station for receiving information signals from the out-stations includes for each of the out-stations a corresponding information signal receiving unit, a corresponding address signal decoding means for receiving the said address code electric signals and responding, when suitably energised, to only the address code electric signal of the corresponding out-station, and a corresponding switching means controlled by the address signal decoding means for connecting the information signal receiving unit to the said information signal transmitting circuit whenever the address signal decoding means responds to the address code electric signal of the corresponding out-station.

According to another feature of the present invention such information systems may also include at one or more of the out-stations an electrically adjustable control means having associated therewith address signal decoding and switching means responsive to a unique address code electric signal of the associated control means for connecting in response thereto the associated control means to an information signal transmitting circuit, and at the central station an electric control signal supply source or sources corresponding to the respective electrically adjustable control means and each having associated therewith address signal decoding and switching means responsive to the unique address code electric signal of the associated control means for connecting in response thereto the associated electric control signal source to the information signal transmitting circuit whereby to supply an electric control signal to the associated control means for effecting adjustment thereof.

According to yet another feature of the present invention such information systems may also include at one or more of the out-stations an auxiliary information signal receiving means having associated therewith address signal decoding and switching means responsive to a unique address code electric signal of the associated auxiliary information signal receiving means for connecting in response thereto the associated auxiliary information signal receiving means to an information signal transmitting circuit, and at the central station one or more auxiliary information signal producing means corresponding to the respective auxiliary information signal receiving means and each having associated therewith address signal decoding and switching means responsive to the unique address code electric signal of the associated auxiliary information signal receiving means for connecting in response thereto the associated auxiliary information signal producing means to the information signal transmitting circuit whereby to supply an information signal from the associated auxiliary information signal producing means at the central station to the associated auxiliary information signal receiving means at one of the out-stations.

An information transmission system according to the invention for use in transmitting information between a plurality of transducers located underground at a plurality of out-stations in a methane producing coal mine and a central station located on the surface will now be described by way of example with reference to the accompanying drawings in which.

Figure 1:
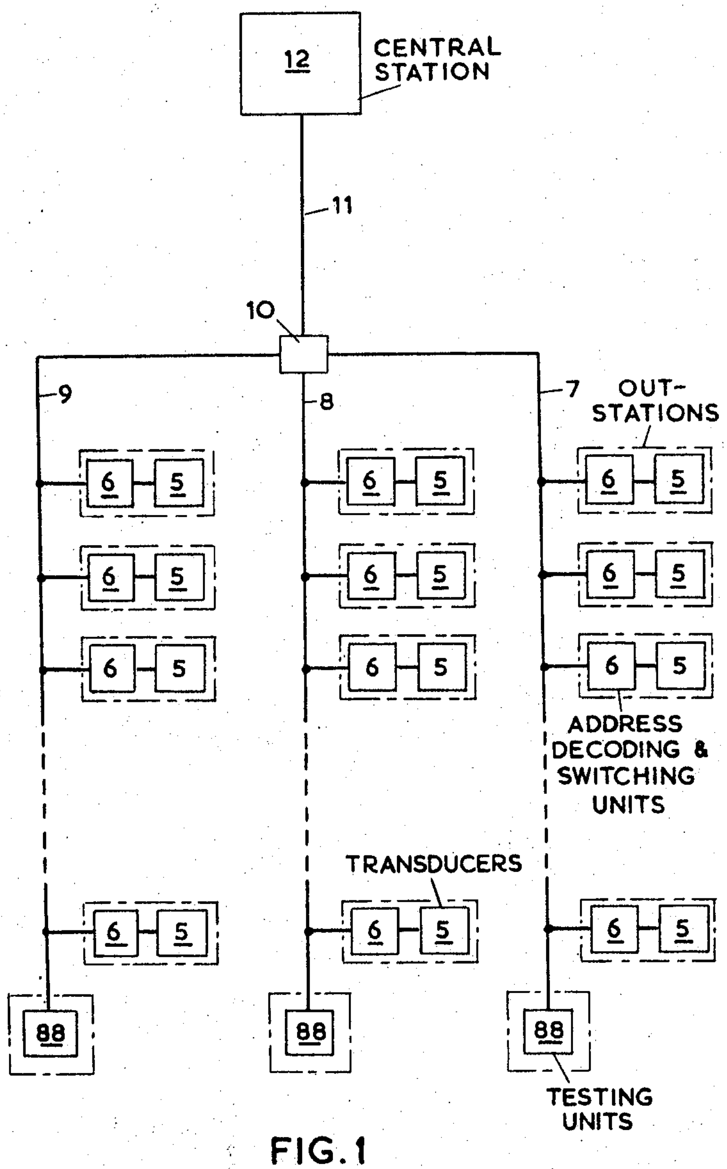
FIG. 1 is a schematic electric circuit diagram showing the overall lay-out of the system.

Referring now to the drawings, FIG. 1 shows a plurality of groups of transducers 5 situated at various widely dispersed out-stations in the mine. There are normally three transducers in each group and each transducer responds to a particular parameter, for example, temperature, pressure, gas flow etc. Each group of transducers 5 is associated with a switching unit 6, which, when operated in a manner to be described later, connects the tranducers in the group to respective pairs of lines of an eight-pair telephone type cable 7, 8 or 9. The cables 7, 8 and 9 are joined in parallel at a junction box 10 to a single eight-pair cable 11 which connects with a central station 12 at the surface of the mine. The central station, to be described in detail below, includes a number of indicating instruments, one for each of all the transducers in all the groups. It will be observed, that the eight-pair cables 7, 8, 9 and 11 provide a common information transmission link between the central station and the groups of transducers 5 to which any such group of transducers may be connected as required.

Figure 2:
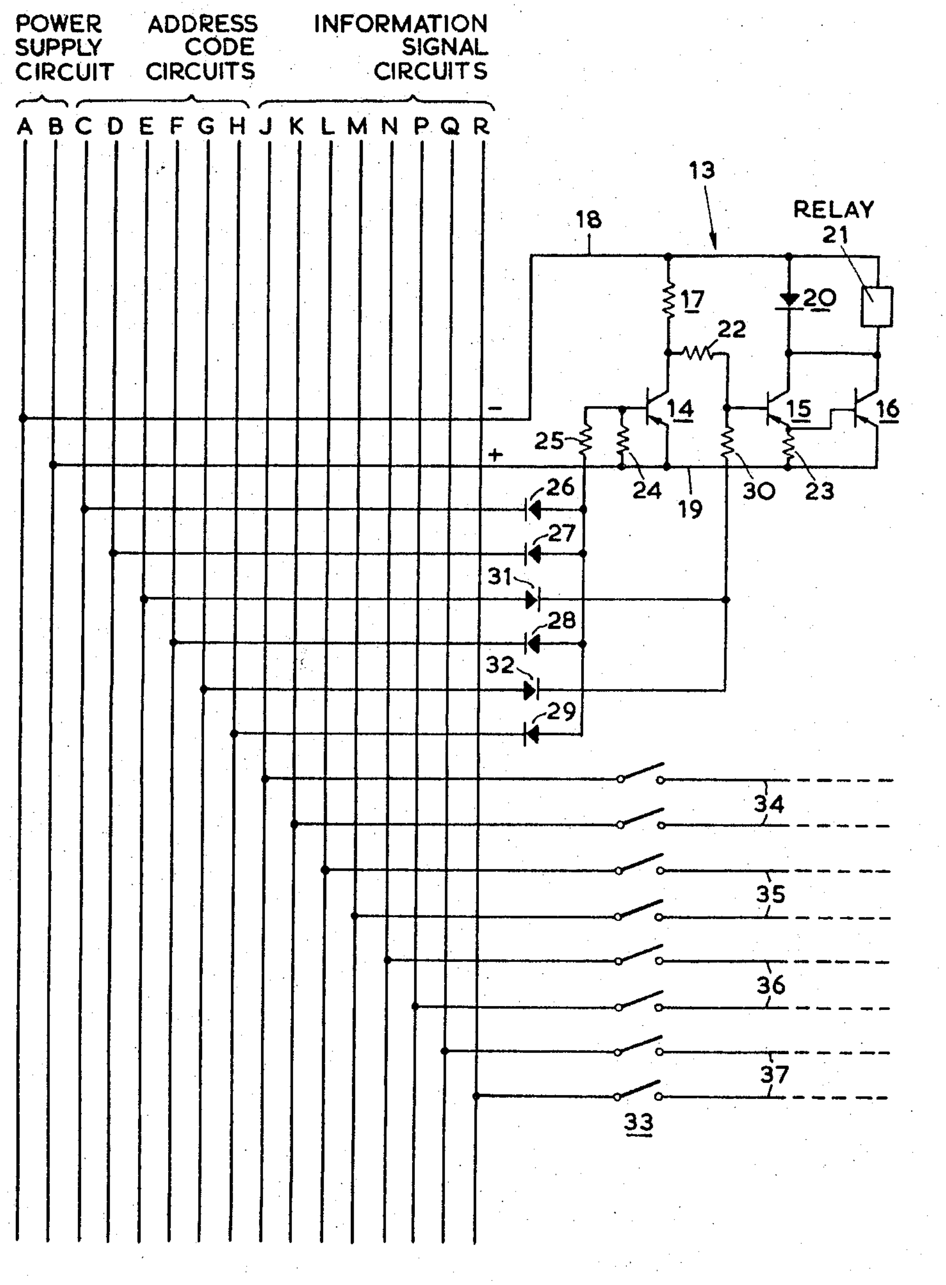
FIG. 2 is an electric circuit diagram of an address signal decoding and switching means associated with one group of transducers at an out-station.

FIG. 2 shows a switching unit 6 for connecting a group of three transducers to the cable 7. The sixteen lines or conductors of the cable are referenced A to R. The switching unit includes a decoding circuit 13 having three p-n-p type transistors 14, 15 and 16. Transistor 14 is connected through a collector resistor 17 to a pair of power supply lines 18 and 19 which are connected, in a manner to be described later, to a power source at the central station. Transistor 15 is connected between positive line 19 and the collector of transistor 16, whilst transistor 16 is connected between the supply lines 18 and 19 and has a relay coil 21 in its collector circuit. A diode 20 is connected across the relay coil 21 to enable the coil to discharge its energy when transistors 15 and 16 are rendered nonconducting. Transistors 14 and 15 are interconnected through a resistor 22 connected from the collector of transistor 14 to the base of transistor 15. Transistor 15 has a resistor 23 in its emitter circuit and is connected to transistor 16 in emitter-follower relationship. The base of transistor 14 is connected to the supply line 19 through a resistor 24, and is also connected through a resistor 25 to diodes 26, 27, 28 and 29 which are respectively connected to lines C, D, F and H of the cable. The base of transistor 15 is connected through a resistor 30 to diodes 31 and 32 which are respectively connected to the lines E and G of the cable. The supply lines 18 and 19 are connected to the lines A and B of the cable.

The lines J to R of the cable are connected through pairs of switch contacts 33 to pairs of lines 34 to 37 which are themselves connected to the three transducers (not shown). The pairs of contacts 33 are closed when the relay coil 21 is energised. Lines A and B are connected to a power supply in the central station 12 (FIG. 1) to provide energisation for transistors 14, 15 and 16.

In operation, an addressing unit in the central station, to be described later, applies various unique combinations of two different levels of voltage to the lines C to H in turn. One such voltage level is positive and the other is relatively negative. The decoding circuit 13 illustrated will cause energisation of the relay coil 21 when lines C, D, F and H are positive and when lines E and G are relatively negative. Under this condition, transistor 14 will be cut off and transistors 15 and 16 will conduct allowing relay coil 21 to be energised thus closing the contacts 33 to connect the transducers to the cable 7. If the lines C to H carry any other combination of voltages, then the relay coil 21 will not be energised because transistors 15 and 16 will not be rendered conductive.

The diodes 26 to 29 and 31 and 32 thus provide two AND gates each controlling one of the transistors 14 and 15: only when the input conditions to both AND gates are simultaneously satisfied is the relay coil 21 energised.

All the switching units 6 contain a decoding circuit 13 similar to that shown in FIG. 2 together with a relay coil 21 and contacts 33. In each case, however, the six diodes 26 to 29 and 31 and 32 are arranged differently with respect to the transistors 14 and 15 and the lines C to H so that different unique combinations of voltages on the lines C to H of the cable 7, 8 or 9 are required to cause energisation of the respective relay coils 21. Each switching unit 6 may therefore be separately addressed from the central station 12 and then operates to connect the associated group of transducers 5 to the common information transmission circuit provided by the cables 7, 8, 9 and 11.

Figure 3:
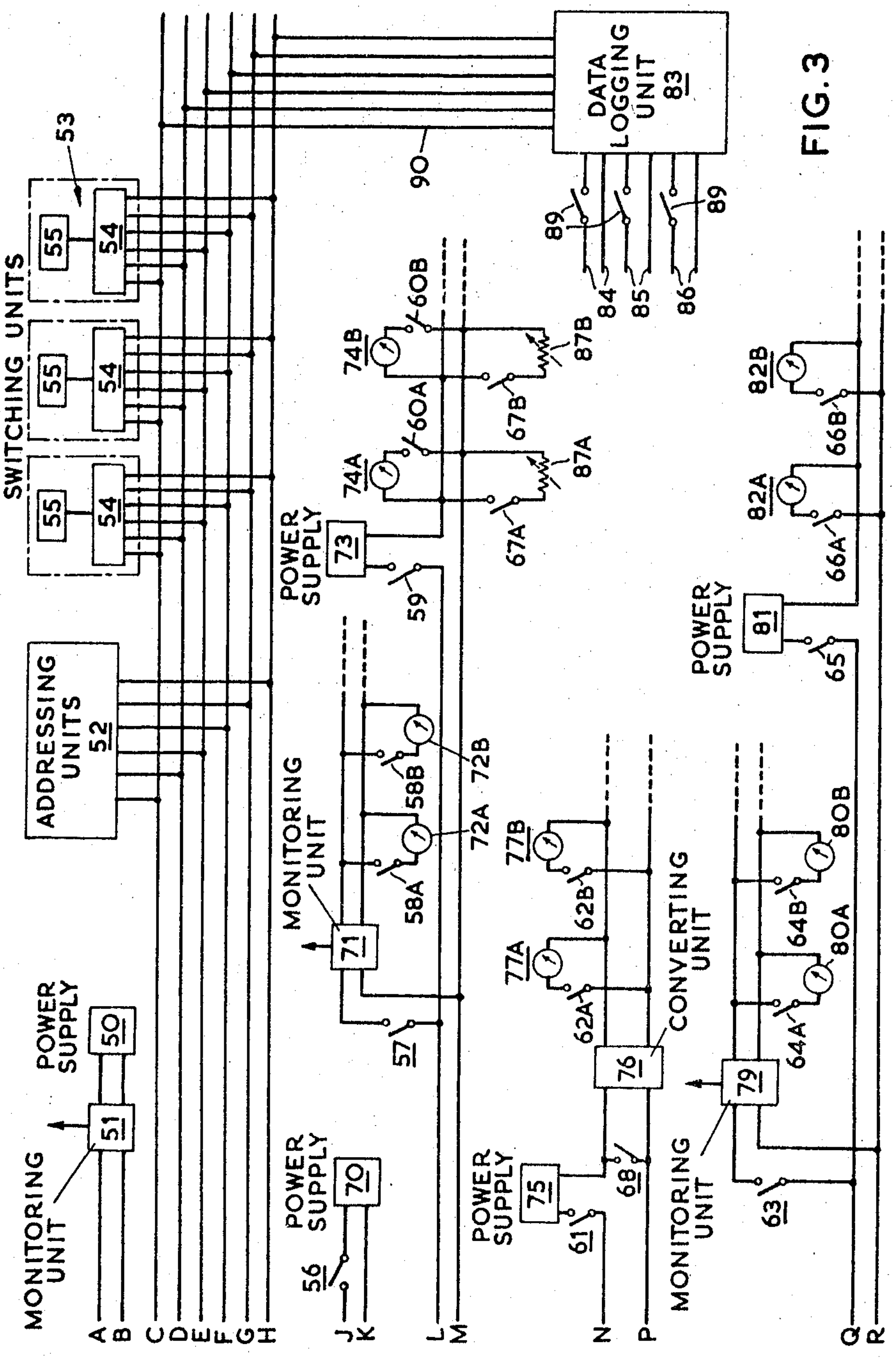
FIG. 3 is a schematic electric circuit diagram of the apparatus located at the central station.

The central station 12 will now be described with reference to FIG. 3 which shows the lines A to R of the cable 11 as they enter the central station from the left hand side of the figure, these lines respectively corresponding with, and being connected at the junction box 10 to, the lines A to R of the cable 7 (FIG. 2) and of the cables 8 and 9.

In the central station, the lines A and B are connected to a power supply unit 50 through a monitoring circuit 51 and provide the necessary continuous power to the supply lines 18 and 19 (FIG. 2) of the decoding circuits 13 in all the switching units 6 at the various out-stations.

The lines C to H are connected to an addressing unit 52. This unit provides the previously mentioned various combination of voltages on the lines C to H, each voltage being either positive or at a predetermined relatively negative level. Each combination of voltages selects a particular switching unit 6 as explained with reference to FIG. 2, and causes it to connect the associated group of transducers 5 to the cable. The addressing unit 52 is arranged as normally to address the switching units 6 sequentially, so that, in a given cycle time, all the switching units are addressed. The addressing unit 52 also contains means permitting a particular switching unit to be addressed out of sequence, and/or continuously at will.

The lines C to H are also connected to a number of switching units 53 each of which is similar to a switching unit 6 described with reference to FIG. 2 and contains a decoding circuit 54 and a relay coil 55 corresponding respectively with the decoding circuit 13 and the relay coil 21 of FIG. 2. Each relay coil 55 controls respective ones of contacts 56 to 68. Each switching unit 53 corresponds with a particular one of the switching units 6 at the out-stations and responds to the same address signal. Each switching unit 53 is connected to a power supply (not shown).

The lines J and K are connected through contacts 56 to a power supply 70 which provides a power supply for some of the transducers 5.

The lines L and M are connected through contacts 57 and a monitoring circuit 71 with a number of indicators 72 (A, B, C, etc.) which are connected in parallel through contacts 58 (A, B, C, etc.). Lines L and M are also connected through contacts 59 and a power supply 73 to a number of indicators 74 (A, B, C, etc.) connected in parallel through contacts 60 (A, B, C, etc.), and to a number of adjustable resistors 87 (A, B, C, etc.) connected in parallel through contacts 67 (A, B, C, etc.).

The lines N and P are connected through contacts 61 and a power supply 75 to a converting unit 76, to which are connected in parallel through contacts 62 (A, B, C, etc.) a number of indicators 77 (A, B, C, etc.).

The lines Q and R are connected through contacts 63 and a monitoring unit 79 with a number of indicators 80 (A, B, C, etc.) which are connected in parallel through contacts 64 (A, B, C, etc.). The lines Q and R are also connected through contacts 65 and a power supply 81 with a number of indicators 82 (A, B, C, etc.) connected in parallel through contacts 66 (A, B, C, etc.).

One indicator is provided for each transducer, but only some of the indicators are illustrated in the figure for the sake of simplicity.

A data logging unit 83 is provided which has three pairs of input lines 84, 85 and 86 which may be connected to the lines L and M, N and P, and Q and R respectively through contacts 89. The data logging unit receives signals from the addressing unit 52 on the lines 90.

The operation of the central station will now be described.

When a particular switching unit 6 is addressed by the addressing unit 52, its decoding circuit 13 operates to cause its relay coil 21 to become energised and to close the contacts 33 to connect the three transducers to the lines L and M, N and P, and Q and R respectively. At the same time, the corresponding switching unit 53 in the central station responds to the address produced by the addressing unit 52 and energises its relay coil 55. This relay coil will cause closure of some of the contacts 56 to 68 so that the appropriate indicators are connected to the appropriate lines L to R to indicate the information transmitted by the particular transducers 5 selected. The operation will now be described in greater detail.

In the arrangement illustrated, each indicator 72 is arranged to indicate methane concentration in a particular position in a mine road-way, each indicator 74 indicates the degree of opening of a particular valve in a mine bore hole, each indicator 77 indicates gas flow in a particular bore hole, each indicator 80 indicates methane concentration in a particular bore hole and each indicator 82 indicates gas pressure in a particular bore hole.

It will be assumed that the three transducers connected to the lines L to R by operation of the particular switching unit 6 are measuring road-way methane concentration, bore hole gas flow, and bore hole methane concentration respectively. The circuit arrangement is therefore initially arranged so that closure of contacts 33 by the relay coil 21 in the switching unit 6 connects these three transducers to the lines L and M, N and P, and Q and R respectively. The corresponding switching unit 53 operates to close contacts 56, 57, 61 and 63 and appropriate ones of the contacts 58, 62 and 64 so that each transducer is connected to the correct indicator and passes signals to it. The transducer measuring bore hole gas flow requires a power supply in order to produce this indication and this is provided by the power supply unit 75. The transducers measuring methane concentration require a power supply and this is provided by the unit 70. The monitoring units 71 and 79 monitor the level of methane concentration as indicated by the signals arriving on the lines L and M, and Q and R, and produce warning outputs if the concentration becomes too high. The signals on the lines N and P relating to the bore hole gas flow are passed through the converting unit 76 which adjusts them so that each indicator 77 may have a linear scale.

If one of the transducers connected to the cable by a switching unit 6 is measuring the degree of opening of a valve in the bore hole, instead of one of the three parameters listed in the above example, then it will be connected to the lines L and M and the contacts 59, and one of the pairs of contacts 60, will be closed by the corresponding switching unit 53. If one of the transducers is measuring gas pressure in a bore hole instead of one of the three parameters in the above example, it will be connected to the lines Q and R and the contacts 65, and one of the contacts 66, will be closed by the corresponding switching unit 53. Power supplies 73 and 81 provide power for the transducers in these cases.

The system also provides facilities for enabling the degree of opening of the valves to be adjusted. Certain switching units 6 are arranged to connect the valve operating motors to the lines L and M and appropriate contacts 67 (A, B, C, etc.) are closed by the corresponding switching unit 53. The valve motor can then be controllably energised by means of an adjusting unit 87 (A, B, C, etc.) whereby to adjust the valve settings.

The various indicators referred to are electrical indicating instruments which are provided with devices for locking their pointers in the positions assumed when repositioned by signals received from the respective transducers. Each instrument pointer is automatically freed when the appropriate transducer is connected to the instrument and is automatically relocked when the pointer has been repositioned by the new signal. The arrangement at the central station therefore provides a continuous indication of the value of parameters at each of a number of out-stations or points in the mine. The information provided by each indicator is normally up-dated once per cycle of scanning of all the groups of transducers.

If it is required to record the information from the transducers in a permanent form such as on paper or magnetic tape, then the switching units 53 are arranged to close the contacts 89 to connect the transducers also to the data logging unit 83 which contains the appropriate recording equipment. The data logging unit 83 also receives signals on the lines 90 representing the address of the switching unit 6 associated with the transducers for the time being connected to the data logging unit, and this address is recorded together with the information to enable the information to be identified. The data logging unit may include an analogue-to-digital converter.

Apparatus is provided for checking various operations of the arrangement described. Firstly, the monitoring unit 51 (FIG. 3) continuously monitors the magnitude of the current in the lines A and B connected to the supply lines 18 and 19 (FIG. 2) of the decoding circuits 13. If the current level in these lines indicates that, owing to a fault, no switching unit 6 or more than one switching unit 6 is operated at a time it will produce a warning output. Secondly, switching units 88 (FIG. 1) are provided at the ends of the cables 7, 8 and 9, (and at any other positions if desired) and these operate, when addressed from the central station, to send signals along the lines A to R of the cables to the central station in order to prove the lines.

The information handling arrangement described above permits a large number of transducers in a mine to be connected to a central station at the surface through the medium of one eight-pair telephone type cable only. The need for individual cables between each transducer and the central station, which might be prohibitively expensive, is avoided and so also is the need for scanning equipment in the mine itself; such scanning equipment might be unsafe in the potentially explosive atmosphere of the mine. The arrangement also has an advantage in that some equipment, such as the monitoring units 71 and 79, the converting unit 76, and power supplies 50, 70, 73, 75 and 81 can be arranged to serve large numbers of transducers; separate equipment need not be provided for each transducer. There is also no need for power supplies to be located in the mine itself where they might present a hazard, and the power sources at the central station for transmitting power to the out-stations are made intrinsically safe, so that the introduction of the transmission system into the mine brings with it no explosion hazards.

A further information transmission system generally similar to that described above also includes means for setting up in the central station control information for transmission through the transmission cables to information receiving and storage devices located at the various out-stations. This extra information transmission facility is achieved by the provision in each out-station of information receiving and storage devices, in the form of for example the above referred to indicators, or otherwise electronic storage registers, each such device having associated therewith an address signal decoding and switching unit, similar to that shown in FIG. 2, for responding to a unique address code electric potential combination and for connecting the information receiving and storage device to appropriate information signal transmission circuits J to R in the transmission cables. In the central station there is provided for each such information receiving and storage device at an out-station an information producing or storage device having associated therewith an address signal decoding and switching unit for responding to the unique address code electric potential combination of the associated receiving and storage device located at an out-station.

Thus in this further system information may be transmitted in both directions between the out-stations and the central station.

In the system described in the drawings the transmission cables each include three pairs of conductors for transmitting information signals simultaneously to the central station. For a given number of items of information to be scanned for transmitted in a cyclic manner, the speed of scanning can of course be increased by including other pairs of information signal transmitting conductors, whilst conversely the speed of scanning can be reduced by decreasing the number of information signal transmitting conductors in the cables. In either case the number of unique address codes varies inversely as the number of information signal transmitting circuits varies.

It should also be noted that the number of pairs of conductors required in the transmission cables is influenced by the type of transducers used to provide the desired information. Some transducers require separate circuits for supplying electrical excitation and for transmitting the desired information resulting from such excitation. Others, as have been described above, operate with a single circuit for providing both the excitation and the information signals.

In a further modification of the systems described above, by appropriate inversion and other minor modification of the gating diode arrangement 26–31 and associated transistors 14–16 which together constitute the decoding device, the power source 50 can be arranged to transmit its power through two or more of the coding lines C–H, so that the lines A and B originally used for supplying power to the decoding device may be dispensed with, or alternately used for extending the range of address codes that can be used. Such modified systems still utilize a power source at the central station for supplying the power required by the decoding and switching units at the out-stations, though separate lines are not required for transmitting such power.

What I claim as my invention and desire to secure by Letters Patent is:

1. A time division analogue signal transmission system for transmitting analogue information signals between a central station and a plurality of widely spaced out-stations at least some of which are located in explosion-hazardous situations, including signal transmission means comprising a multi-conductor electric cable extending from the central station to each out-station in turn, the cable including "address" conductors for transmitting address code signals and "information" conductors for transmitting analogue information signals;

located at each out-station a group of analogue information signal producing means for producing analogue signals representative of various predetermined control parameters at the out-stations;

first switching means for connecting the respective information signal producing means with predetermined information conductors in response to a command signal;

and address decoding means having an input circuit connected with the address conductors and an output circuit connected with the first switching means for supplying a command signal to the said first switching means whenever the combination of electric potentials applied to the address conductors represents the address of the out-station;

and located at the central station a plurality of groups of information signal storage means for receiving and storing temporarily information signals transmitted from the respective groups of information signal producing means at the respective out-stations;

a plurality of second switching means for connecting the respective groups of information signal storage means with the said predetermined information conductors in response to respective command signals;

a plurality of address decoding means each associated with one of the said switching means and each having an input circuit connected with the address conductors and an output circuit connected with the associated second switching means for supplying a command signal to the associated second switching means in response to the presence of a unique combination of electric potentials on the address conductors which represents the address of the associated out-station;

an address code signal producing means connected with the address conductors for applying in sequence predetermined unique combinations of electric potentials to the address conductors, each such combination representing the address of one out-station, so as to connect in turn each group of information signal storage means with its corresponding group of information signal producing means; and an electric power supply means for supplying through conductors of the cable electric power for enabling the address decoding means, the first switching means, and the analogue signal producing means at each out-station to function in response to the application of address code signal potentials to the address conductors by the address code signal producing means.

2. A time division analogue signal transmission system according to claim 1, wherein the respective first switching means associated with selected groups of information signal producing means connect information signal producing means for providing information signals representative of a common control parameter at selected out-stations to the same information conductors, and including at the central station a common signal converting means connected in circuit between the said same information conductors and the associated second switching means whereby to provide similar conversion of information signals relating to that control parameter from the selected out-stations.

3. A time division analogue signal transmission system according to claim 1, including at the central station an electric supply source for exciting predetermined similar information signal producing means at some of the out-stations whereby to enable them to provide their respective information signals, and wherein the respective second switching means associated with each of the said predetermined similar information signal producing means includes means for connecting the excitation electric supply source in series relationship with the information conductors associated with the said predetermined information signal producing means whereby to excite the said information signal producing means and thereby cause them to provide their respective information signals.

4. A time division analogue signal transmission system according to claim 1, including at some of the out-stations an electrically adjustable control means and at the central station for each such control means an associated control signal producing means for sending control signals to such control means, and wherein the said first and second switching means associated with each such out-station include switching devices for enabling the associated electrically adjustable control means to be connected with the associated control signal producing means at the central station through selected information conductors of the cable whenever the associated out-station address code signals are applied to the address conductors by the address code signal producing means.

5. A time division analogue signal transmission system according to claim 1, including located at one out-station a test signal producing means for providing test signals for enabling the condition of the transmission means to be checked at the central station;

third switching means for connecting the test signal producing means with predetermined information conductors in response to a command signal;

address decoding means having an input circuit connected with the address conductors and an output circuit connected with the third switching means for supplying a command signal to the said third switching means whenever the combination of electric potentials applied to the address conductors represents the address of the out-station; and located at the central station test apparatus for checking the condition of the transmission means;

fourth switching means for connecting the said test apparatus with the said predetermined information conductors in response to a command signal;

address decoding means having an input circuit connected with the address conductors and an output circuit connected with the fourth switching means for supplying a command signal to the fourth switching means whenever the combination of electric potentials applied to the address conductors represents the address of the said one out-station.

6. A time division analogue signal transmission system according to claim 1, including at some of the out-stations information signal storage means and at the central station associated information signal producing means for providing information signals for storage in such storage means at the out-stations, and wherein the first and second switching means associated with each such out-station includes switching devices for enabling each such information storage means at an out-station to be connected with the associated information signal producing means at the central station through information conductors of the cable whenever the out-station address code signals are applied to the address conductors by the address code signal producing means.

References Cited

UNITED STATES PATENTS

| | | | |
|---|---|---|---|
| 3,253,260 | 5/1966 | Hawley | 340—151 |
| 3,300,759 | 1/1967 | Chapman et al. | 340—150 |

DONALD J. YUSKO, *Primary Examiner.*